(12) United States Patent
Baltaxe et al.

(10) Patent No.: US 12,291,231 B2
(45) Date of Patent: May 6, 2025

(54) VEHICLE WITH POLARIMETRIC IMAGE NORMALIZATION LOGIC

(71) Applicant: GM GLOBAL TECHNOLOGY OPERATIONS LLC, Detroit, MI (US)

(72) Inventors: Michael Baltaxe, Kfar Saba (IL); Tzvi Philipp, Bet Shemesh (IL); Tomer Pe'er, Rishon Lezion (IL); Dan Levi, Ganei Tikvah (IL)

(73) Assignee: GM Global Technology Operations LLC, Detroit, MI (US)

( * ) Notice: Subject to any disclaimer, the term of this patent is extended or adjusted under 35 U.S.C. 154(b) by 204 days.

(21) Appl. No.: 18/178,733

(22) Filed: Mar. 6, 2023

(65) Prior Publication Data

US 2024/0300517 A1 Sep. 12, 2024

(51) Int. Cl.
*B60W 60/00* (2020.01)
*G06T 7/70* (2017.01)
*H04N 23/54* (2023.01)

(52) U.S. Cl.
CPC ............. *B60W 60/001* (2020.02); *G06T 7/70* (2017.01); *H04N 23/54* (2023.01); *B60W 2556/50* (2020.02); *G06T 2207/10024* (2013.01); *G06T 2207/30256* (2013.01)

(58) Field of Classification Search
CPC ... B60W 60/001; B60W 2556/50; G06T 7/70; G06T 2207/10024; G06T 2207/30256; H04N 23/54
See application file for complete search history.

(56) References Cited

U.S. PATENT DOCUMENTS

| | | | |
|---|---|---|---|
| 10,641,897 | B1 | 5/2020 | Dussan |
| 12,061,091 | B2 | 8/2024 | Dittmer |
| 2016/0046290 | A1 | 2/2016 | Aharony |
| 2018/0005012 | A1* | 1/2018 | Aycock ...................... G01J 4/04 |
| 2021/0264169 | A1* | 8/2021 | Speigle ................. G06T 3/4015 |

FOREIGN PATENT DOCUMENTS

| | | |
|---|---|---|
| CN | 112954281 A | 6/2021 |
| DE | 102018205964 A1 | 10/2018 |
| DE | 102020129096 A1 | 6/2021 |
| DE | 112020004884 T5 | 7/2022 |
| KR | 20130040964 A | 4/2013 |

\* cited by examiner

*Primary Examiner* — Russell Frejd
*Assistant Examiner* — Ana D Thomas
(74) *Attorney, Agent, or Firm* — Quinn IP Law

(57) ABSTRACT

A system for a host vehicle operating on a road surface includes a polarimetric camera, a global positioning system ("GPS") receiver, a compass, and an electronic control unit ("ECU"). The camera collects polarimetric image data of a drive scene, including a potential driving path on the road surface. The ECU receives the polarimetric image data, estimates the Sun location using the GPS receiver and compass, and computes an ideal representation of the road surface using the Sun location. The ECU normalizes the polarimetric image data such that the road surface has a normalized representation in the drive scene, i.e., an angle of linear polarization ("AoLP") and degree of linear polarization ("DoLP") equal predetermined fixed values. The ECU executes a control action using the normalized representation.

20 Claims, 3 Drawing Sheets

VEHICLE WITH POLARIMETRIC IMAGE NORMALIZATION LOGIC

INTRODUCTION

Autonomously-controlled vehicles rely on computer vision capabilities, which in turn are developed using various machine learning techniques. For example, an onboard controller of an autonomous vehicle may use computer vision capabilities to differentiate the roadway surface and features thereon from a non-drivable surrounding environment. Using an onboard sensor suite, the controller is able to estimate the location of the road surface for improved route planning and execution, as well as locate other vehicles, pedestrians, curbs, sidewalks, trees, buildings, and other potential obstacles. Additionally, the controller may look to painted surface markings and smooth materials such as water, ice, and oil that could affect vehicle performance and control decisions. The collective set of "perception" information is thereafter used by the controller to control an autonomous drive event.

Image data collected by the various sensors of the onboard sensor suite includes digital pixel data corresponding to drivable surface area or "free space". Free space in a given image is typically estimated as a binary segmentation of the collected image, with image segmentation techniques being performed to separate the drivable surface area from corresponding non-drivable surface areas. Color video alone is suboptimal for detecting free space, for various reasons. For instance, a paved road surface often uses similar paving materials and colors as other structures or features in the imaged scene, such as curbs or sidewalks. As a result, a given surface is often easily confused for another in the same imaged scene, which in turn may reduce the accuracy of onboard free space estimation and path planning functions.

SUMMARY

The automated solutions described herein are collectively directed toward improving the overall drive experience of a motor vehicle or another host vehicle using polarimetric image data from collected images of a drive scene illuminated by the Sun. In particular, the present disclosure pertains to the use of a global positioning system ("GPS") receiver and an onboard compass to calculate the Sun location, and then using the Sun location to normalize polarimetric images. As a result, the changing Sun location will not affect a polarimetric representation of the imaged drive scene.

In particular, an aspect of the present disclosure includes a system for a host vehicle operating on a road surface illuminated by the Sun. The system according to an exemplary embodiment includes a polarimetric camera, a GPS receiver, a compass, and an electronic control unit ("ECU"). The camera is configured to collect polarimetric image data of a drive scene of the host vehicle, with the drive scene including the road surface and its surrounding environs. The ECU is programmed to receive the polarimetric image data from the polarimetric camera, as well as to estimate the location of the Sun using information from the GPS receiver and compass. The ECU also constructs a normalized representation of the polarimetric image data using the location of the Sun, via normalization logic. In the normalized representation, an angle of linear polarization ("AoLP") of incident light at the road surface is equal to 0° or another fixed predetermined angular value. The ECU then executes a control action aboard the host vehicle using the normalized representation of the polarimetric image data.

The ECU in one or more embodiments is configured to calculate a local surface normal ($\vec{N}$) for each image pixel of the road surface using the Sun location and a location of the camera relative to the road surface. The ECU also estimates the AoLP and a degree of linear polarization ("DoLP") as estimated AoLP and DoLP values using the local surface normal ($\vec{N}$). Additionally, the ECU normalizes the polarimetric image data using the estimated AoLP and DoLP values.

The host vehicle as contemplated herein may be constructed as a motor vehicle having a vehicle body, in which case the polarimetric camera may be connected to the vehicle body as a body-mounted camera, e.g., to a rearview mirror assembly that is mounted to the vehicle body via a windshield. In one or more embodiments, the camera could be implemented as a combined color-polarimetric camera or a monochrome-polarimetric camera, with the ECU being configured to use color image data or monochromatic image data from the color-polarimetric or monochromatic-polarimetric camera in addition to the polarimetric data to perceive the ground plane/road surface as part of an onboard perception function.

An aspect of the disclosure includes the ECU being in communication with a path planning control module of the host vehicle, and configured to output the normalized representation of the imaged drive scene to the path planning control module as at least part of the above-noted control action.

In some implementations, one or more display screens may be located aboard the host vehicle, with the above-summarized path planning control module being in communication with the display screen(s). The path planning control module could optionally display a graphical representation of the road surface via the display screen(s).

A method is also disclosed herein for use with a host vehicle operating on a road surface illuminated by the Sun. An embodiment of the method includes collecting polarimetric image data of a drive scene using a polarimetric camera, with the drive scene including the road surface. The method also includes receiving the polarimetric image data from the polarimetric camera via an ECU, a location of the host vehicle via a GPS receiver, and a current directional heading of the host vehicle via a compass.

The method in this embodiment includes estimating the location of the Sun using the GPS receiver and compass, and then computing an ideal representation of the road surface using the estimated Sun location. This action entails normalizing the polarimetric image data using the Sun location such that the road surface has a normalized representation on the ground plane/road surface. A control action is then performed aboard the host vehicle using this normalized representation.

In yet another aspect of the disclosure, a motor vehicle includes a vehicle body, road wheels connected to the vehicle body, and a system having a polarimetric camera, a GPS receiver, a compass, and an ECU. The polarimetric camera is mounted to the vehicle body and configured to collect polarimetric image data of a drive scene. The drive scene includes a road surface illuminated by the Sun, and thus includes a potential driving path of the host vehicle thereon. The ECU in this embodiment is configured to receive polarimetric image data from the polarimetric camera, estimate a location of the Sun using a location of the motor vehicle from GPS receiver and a directional heading of the motor vehicle from the compass, and normalize the polarimetric image data using the Sun location such that the AoLP of the road surface equals a predetermined fixed angular value, e.g., 0°, and the DoLP equals a predetermined degree value, e.g., 0. The ECU then executes a control action aboard the host vehicle using the normalized representation.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

The accompanying drawings, which are incorporated into and constitute a part of this specification, illustrate implementations of the disclosure and together with the description, serve to explain the principles of the disclosure.

The appended drawings are not necessarily to scale, and may present a simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

Components of the disclosed embodiments may be arranged in a variety of configurations. The following detailed description is therefore not intended to limit the scope of the disclosure as claimed, but rather is representative of possible embodiments thereof. In addition, while numerous specific details are set forth in the following description to provide a thorough understanding of various representative embodiments, embodiments may be capable of being practiced without some of the disclosed details. Moreover, in order to improve clarity, certain technical material understood in the related art has not been described in detail. Furthermore, the disclosure as illustrated and described herein may be practiced in the absence of an element that is not specifically disclosed herein.

The present automated solutions are operable for improving upon the current state of the art in the realm of machine-based perception. Current perception systems use standard red-green-blue ("RGB") images and lidar point clouds as control inputs. The present solutions instead exploit light's polarization state to improve perception accuracy. Although lidar is a polarized source of information, lidar has a single polarization state. This is due to the polarimetric properties of a lidar-imaged scene not being sampled by the lidar sensor. The present approach forgoes use of lidar in favor of a computer-based approach for normalizing representation of the polarization state of a road surface or other ground plane in the collected image data, such that the angle of linear polarization ("AoLP") and the degree of linear polarization ("DoLP") remain at predetermined fixed values, e.g., 0° and 0, respectively. The road surface in the imaged drive scene therefore fits the proposed normalized representation.

Figure 1:
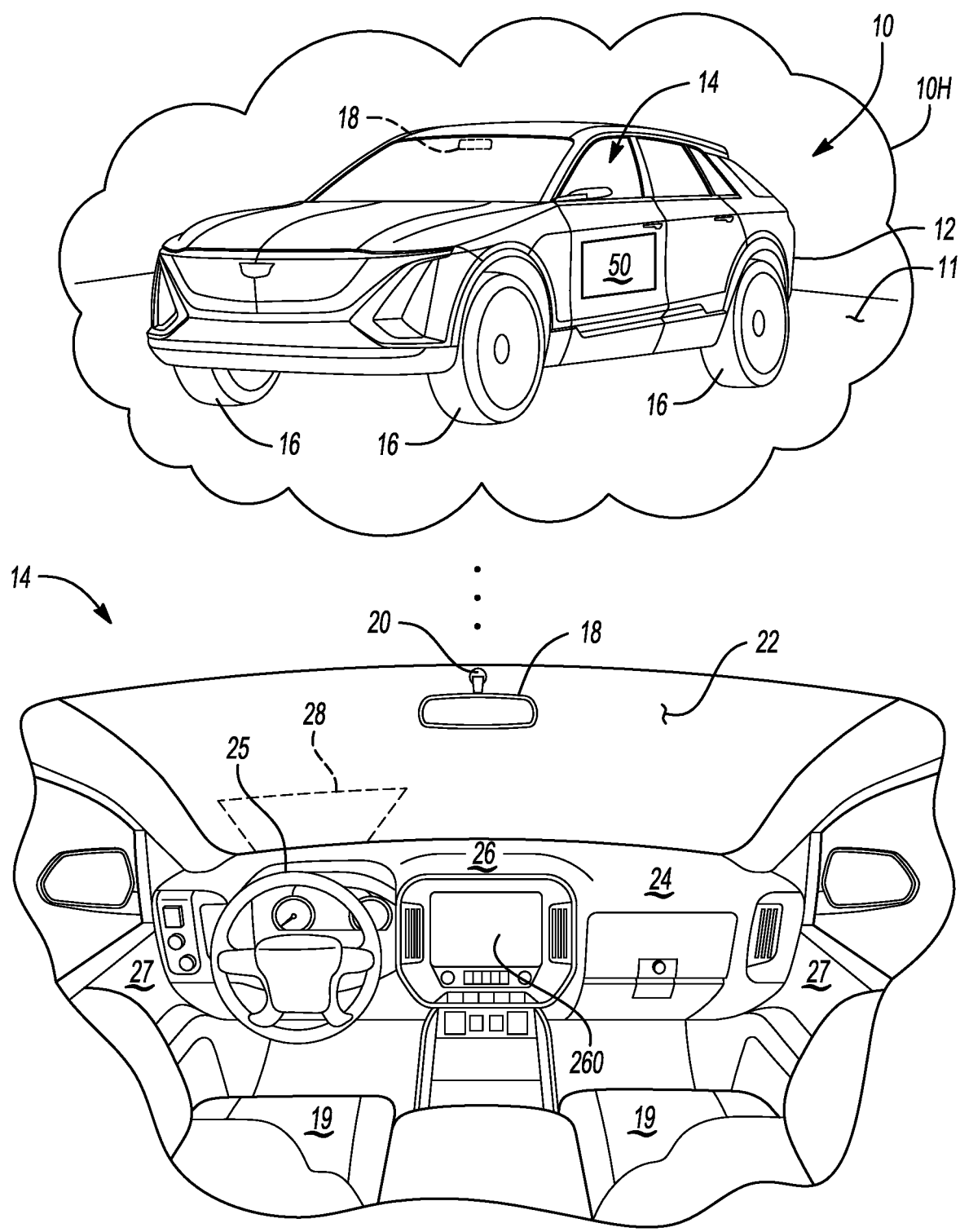
FIG. 1 is an illustration of a host vehicle equipped with a system programmed with polarimetric image data normalization logic in accordance with the present disclosure.

As shown in FIG. 1, a representative use case used throughout the following disclosure is that of a host vehicle 10H. The host vehicle 10H travels on a drivable road surface 11, e.g., a paved or unpaved highway, lane, or surface street. The drivable road surface 11 in turn is at least partially surrounded or bordered by non-drivable surfaces (not shown), such as but not limited to sidewalks, grass, wooded area, or water bodies. The technical solutions set forth in detail herein with reference to FIGS. 2-4 ultimately relate to estimating free space in an imaged drive scene inclusive of the drivable road surface 11 and its surrounding non-drivable environs. The improved accuracy provided by the present normalization strategy is usable in a wide variety of mobile applications, e.g., automated path planning, autonomous drive decision making, improved vehicle-to-occupant communication, etc.

As described below, the imaged drive scene is ascertained using multi-modal data, including polarimetric image data. In accordance with the disclosure, the collected polarimetric image data is normalized through performance of a method 100, a non-limiting example embodiment of which is described below with reference to FIG. 4. The method 100 ensures that the location of the Sun 15 (FIG. 2) to the road surface 11, does not affect the polarimetric representation of the imaged drive scene.

The host vehicle 10H of FIG. 1 is described herein as being embodied as the autonomously-controlled motor vehicle 10, e.g., a passenger vehicle as shown. However, the present teachings may be applied in other mobile systems having a ground-based drive path that is not predefined or restricted, e.g., by rails, tracks, or the like. For example, the solutions described in detail below may be used with wheeled or tracked transport vehicles, farm equipment, trucks, delivery vehicles, mobile platforms, etc. Solely for illustrative consistency, the host vehicle 10H of FIG. 1 will be described hereinafter as the motor vehicle 10 without limiting the disclosure to such an embodiment.

The motor vehicle 10 is equipped with an electronic control unit ("ECU") 50. The ECU 50 in turn is configured via software programming and the use of suitable hardware to analyze the surrounding drive environs of the motor vehicle 10. As used herein, "drive environs" refers to a potential/candidate set of drivable surface areas in an imaged drive scene for consideration by the ECU 50 or other systems when planning a drive path and/or when communicating the drive path to one or more passengers (not shown) seated within the vehicle interior 14. More specifically, the ECU 50 is configured to normalize collected polarimetric image data for the purpose of identifying free space or performing other perception tasks in such drive environs, with an ultimate goal of improving the overall accuracy of drive path planning processes while reducing hardware costs associated with these important tasks.

Further with respect to the exemplary motor vehicle 10, the vehicle body 12 is connected to one or more road wheels 16, with a typical four wheel configuration shown in FIG. 1. At least one of the road wheels 16 is powered by torque from a powertrain system (not shown), e.g., an electric traction motor(s) and/or an internal combustion engine and associated torque transfer mechanisms, to provide drive torque to the road wheels 16 at levels sufficient for propulsion. Depending on the particular configuration of such a powertrain system, the motor vehicle 10 of FIG. 1 could be variously embodied as a battery electric vehicle, a hybrid electric vehicle, a plug-in hybrid electric vehicle, an extended-range electric vehicle, a fuel cell vehicle, a gasoline, diesel, or a compressed natural gas or biofuel-powered vehicle in different constructions. The vehicle body 12 for its part may vary with the configuration of the motor vehicle 10, for instance as a sedan, coupe, pickup truck, crossover, sport utility vehicle, or other body style.

The vehicle interior 14 as depicted in FIG. 1 may be equipped with one or more rows of vehicle seats 19, with two such vehicle seats 19 illustrated in FIG. 1 adjacent driver and passenger doors 27 aft of a windshield 22 and an instrument panel 24. A rearview mirror assembly 18 may be mounted to the windshield 22, with one or more polarimetric cameras 20 connected to the windshield 22, the rearview mirror assembly 18, and/or other suitable surfaces of the motor vehicle 10 in different body-mounted embodiments of the camera 20. The vehicle interior 14 of FIG. 1 is also equipped with various driver input devices, such as a steering wheel 25 and brake and accelerator pedals (not shown), etc. For the purpose of facilitating interaction between the ECU 50 and occupants of the motor vehicle 10, the instrument panel 24 may be equipped with a center stack 26 having an infotainment display screen 260.

In one or more embodiments, the motor vehicle 10 could also be equipped with a heads-up display ("HUD") 28. The HUD 28 is configured and positioned for projecting information onto the windshield 22 as shown, or onto a separate HUD display (not shown) situated on or adjacent to the instrument panel 24. The windshield 22 (and thus the camera 20) are connected or mounted to the vehicle body 12. Either or both of the HUD 28 and the display screen 260 may be controlled to display a graphical representation of the estimated free space, e.g., as a color view of the imaged drive scene ahead of the motor vehicle 10, with identified free space in the drive scene incorporated into the drive path planning function of the ECU 50 or a separate path planning control module ("PPM") 62 as illustrated in FIG. 2.

Figure 2:
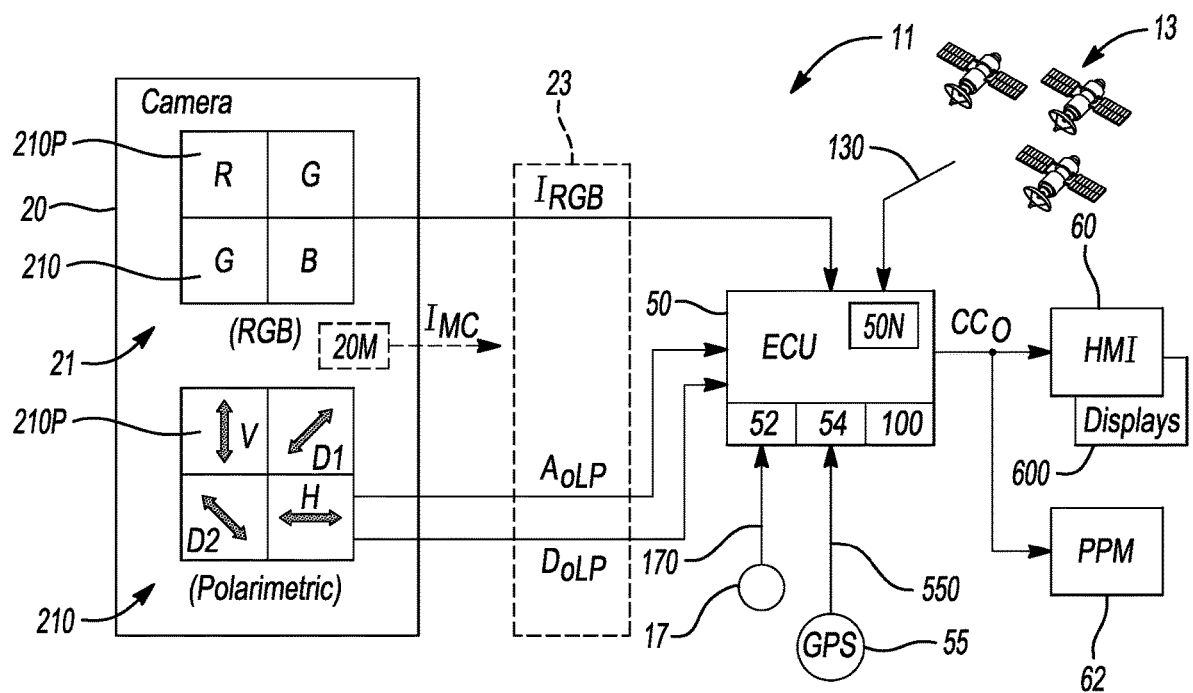
FIG. 2 is a flow diagram describing an embodiment of a system for use with the representative host vehicle of FIG. 1.

Referring to FIG. 2, the ECU 50 relies on the availability and use of polarimetric image data from the polarimetric camera(s) 20 for the purpose of identifying drivable surface area or performing other perception tasks in the imaged drive scene. Such drivable areas are referred to as "free space" as noted above, the presence or absence of which is determined using two-polarimetric image data 23 collected by the camera(s) 20. As appreciated by those skilled in the art, polarimetric image data is available through specialized multi-modal cameras operable for collecting not only polarization state information, but also data from a particular band of the electromagnetic spectrum.

FIG. 2 illustrates one such case in the form of non-limiting color-polarimetric data in the form of red-green-blue ("RGB") image data ($I_{RGB}$), while in an alternative possibility the polarimetric image data 23 includes monochromatic image data (IMC) from a corresponding monochromatic image sensor 20M. However, the present disclosure is not limited to RGB sensors, and thus could extend to different color filter arrays, e.g., red-green-green-clear ("RGGC") red-clear-clear-green ("RCCG"), or red-green-yellow-clear ("RGYC") to name just a few possible permutations.

The non-limiting exemplary RGB-polarization capability of the camera 20 is represented in FIG. 2 as a color pixel block 21 constructed of red ("R"), green ("G"), and blue ("B") image pixels 210. Each image pixel 210 includes four or more constituent sub-pixels 210P, for a total of sixteen or more pixel calculation units as appreciated in the art. $I_{RGB}$ represents the RGB color information contained in the polarimetric image data 23 as provided to the ECU 50, as noted above. The polarization data is time-synchronized with the RGB or monochromatic data. In FIG. 2, for instance, the polarization data is represented as polarized pixel block 210 having four pixel calculation units or sub-pixels 210P. Each of the sub-pixels 210P in turn has a corresponding polarity direction as indicated by polarization arrows V, D1, D2, and H representing vertical, first and second diagonal, and horizontal polarities, respectively. The polarimetric image data 23 communicated to the ECU 50 by the camera(s) 20 thus includes polarimetry and possibly also RGB or monochromatic image data, with the former being in the form of an angle of linear polarization ("AoLP") and a degree of polarization ("DoLP").

As will be appreciated by those of ordinary skill in the art, polarimetry pertains to the measurement and interpretation of a polarization state of transverse waves, such as the light waves considered in the present application. Polarimetry is often used to study properties of interest in different materials, as well as the presence or absence of certain substances therein. For instance, ambient sunlight falling incident upon the drivable road surface 11 of FIG. 1 will reflect off of the drivable road surface 11 to some extent. AoLP as appreciated in the art is the average polarization angle of the incident light from the Sun 15 or another source at a given image pixel. DoLP in turn is the specific proportion of the incident light that is polarized at a given image pixel. For a perfectly polarized light source, its DoLP is 1 (or 100%), while perfectly unpolarized light would have a corresponding DoLP of 0 (or 0%). As a representation of the polarimetric data, the ECU 50 may use the AoLP, which is in the range (0°-180°), and the DoLP with its range (0-1). The ECU 50 thus determines the polarization state of the reflected portion of the incident sunlight, normalizes this information via performance of the method 100, and uses the normalized information to inform decisions and control actions aboard the motor vehicle 10 of FIG. 1.

For example, the ECU 50 of FIGS. 1 and 2 may use the normalized polarization state to ascertain drive scene information, including the orientation and material properties of the drivable road surface 11, the viewing direction of the camera 20, the illumination direction of incident sunlight, etc. The polarization state in turn may be measured by the camera 20 by passing reflected light through polarizing filters (not shown, but present on top of each of the sub-pixels 210P), and thereafter measuring light intensity as the light is transmitted from the polarizing filters. The amount of transmitted light depends on the angle between the polarizing filter and the oscillation plane of the electrical field of incident light, and thus can be measured and used by associated processing hardware of the camera(s) 20 to determine the polarization state. This state is then normalized in accordance with the disclosure.

In order to perform the disclosed estimation and perception functions, e.g., to identify free space in the collected polarimetric image data 23 of FIG. 2, one or more processors 52 of the ECU 50 are configured to execute computer-readable instructions embodying the method 100. The instructions and corresponding method 100 may be implemented as control logic or computer-readable instructions from memory 54, with the memory 54 also being loaded with normalization logic 50N as described below with reference to FIGS. 3 and 4. The memory 54, which may include tangible, non-transitory computer-readable storage medium, e.g., magnetic media or optical media, CD-ROM, and/or solid-state/semiconductor memory, such as various types of RAM or ROM. The processor(s) 52 could include, e.g., Application Specific Integrated Circuit(s) (ASICs), Field-Programmable Gate Arrays (FPGAs), electronic circuit(s), central processing unit(s), microprocessor(s), etc.

Various other hardware in communication with the ECU 50 may include, e.g., input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Non-transitory components of the memory 54 are capable of storing machine-readable instructions in the form of one or more software or firmware programs or routines, combinational logic circuit(s), input/output circuit(s) and devices, signal conditioning and buffer circuitry and other components that can be accessed by one or more processors 52 to provide a described functionality.

Within the scope of the present disclosure, the ECU 50 is in communication with a global positioning system ("GPS") receiver 55, which in turn receives GPS signals 550 from an orbiting constellation of GPS satellites 13. The ECU 50 is thus apprised of the ground plane coordinates of the motor vehicle 10 of FIG. 1. The ECU 50 is also in communication with a compass 17, which in turn provides directional heading signals 170 indicative of the current heading of the motor vehicle 10. When performing the method 100 using the normalization logic 50N, the ECU 50 thus receives a set of inputs from the GPS receiver 55, the compass 17, and the camera(s) 20 and then normalizes the polarimetric portions of the polarimetric image data 23 as described below. The ECU 50 also transmits output signals ($CC_O$) as a control action, e.g., to a human-machine interface ("HMI") 60 and/or to one or more display screens 600 connected thereto, and/or to the PPM 62. The display screen(s) 600 may include the HUD 28 or infotainment display screen 260 shown in FIG. 1. The PPM 62 for its part may be embodied as one or more processors or electronic control modules akin to the processor 52 or sharing processing capabilities thereof, with the PPM 62 being configured to auto-generate a driving path that the motor vehicle 10 will ultimately travel on during an autonomous or semi-autonomous drive event. Such a path utilizes identified free space to separate the drivable surfaces 11 from non-drivable surface areas.

Figure 3:
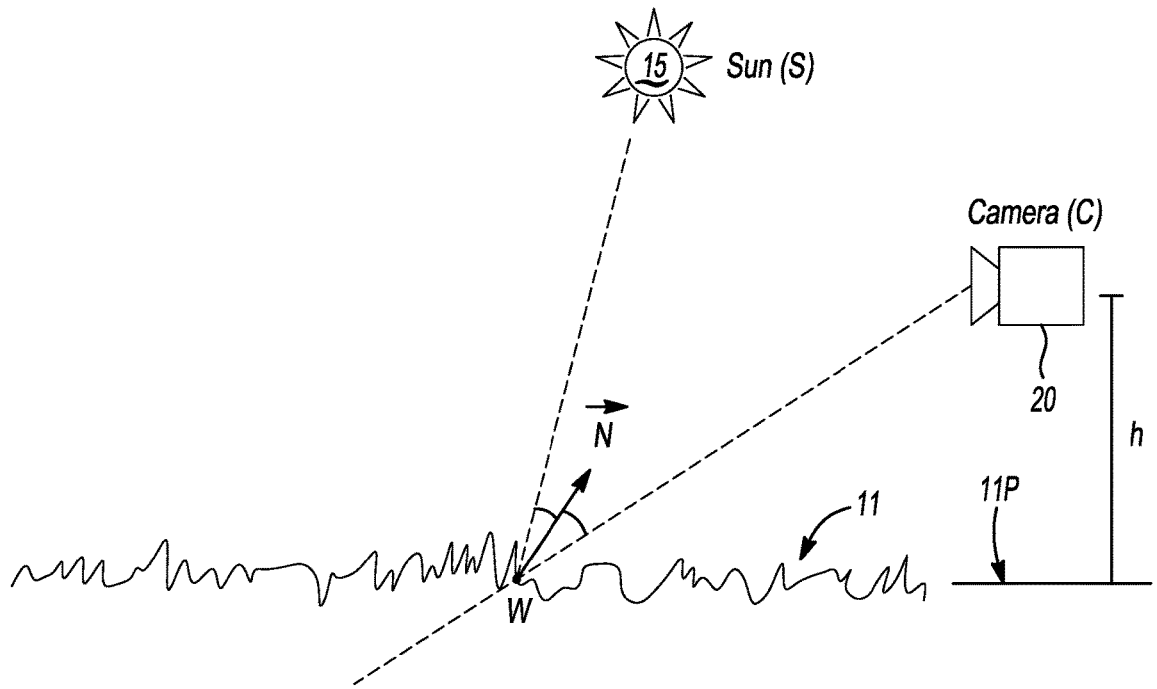
FIG. 3 illustrates an exemplary road surface illuminated by the Sun and a polarimetric camera positioned relative to the road surface.

Referring briefly to FIG. 3, the method 100 as performed by the ECU 50 operates in part by finding the location of the Sun 15 relative to the camera 20, which in turn is positioned at a height (h) above the ground plane 11P. In a representative driving scenario, an underlying assumption of the method 100 is that the relevant materials in an imaged drive scene scatter incident light in a specular direction relative to the surface normal. At a more granular level, the method 100 therefore uses this specular effect by determining the local surface normal ($\vec{N}$) for each projected image pixel in the imaged scene. On this small scale, the local surface normal ($\vec{N}$) at a point (W) in the real world is defined by the location of the Sun 15 and the camera 20 relative to point (W). In turn, the local surface normal ($\vec{N}$) defines the relevant polarization parameters, AoLP and DoLP, at point W. Given the calibration parameters (K) for the camera 20, including at least the principal point and focal distance, the ECU 50 is able to obtain the 3D world location W for the constituent pixels in the resulting images, assuming such images fall on the ground plane 11P a height (h) relative to the camera 20.

In the present approach, a location (S) of the Sun 15 relative to the camera 20 allows the ECU 50 of FIGS. 1 and 2 to estimate the local surface normal ($\vec{N}$) for each image pixel. Using the estimated surface local normal ($\vec{N}$) for each collected image pixel, the ECU 50 estimates the AoLP and DoLP in each image pixel when imaging the ground plane. Then, using the estimated AoLP and DoLP, the ECU 50 normalizes the polarimetric image data such that the ground plane 11P fits a standard canonical representation. For example, the ECU 50 may set the reference plane for the AoLP at 0° in a possible implementation, or the ECU 50 may use another predetermined angular value.

Figure 4:
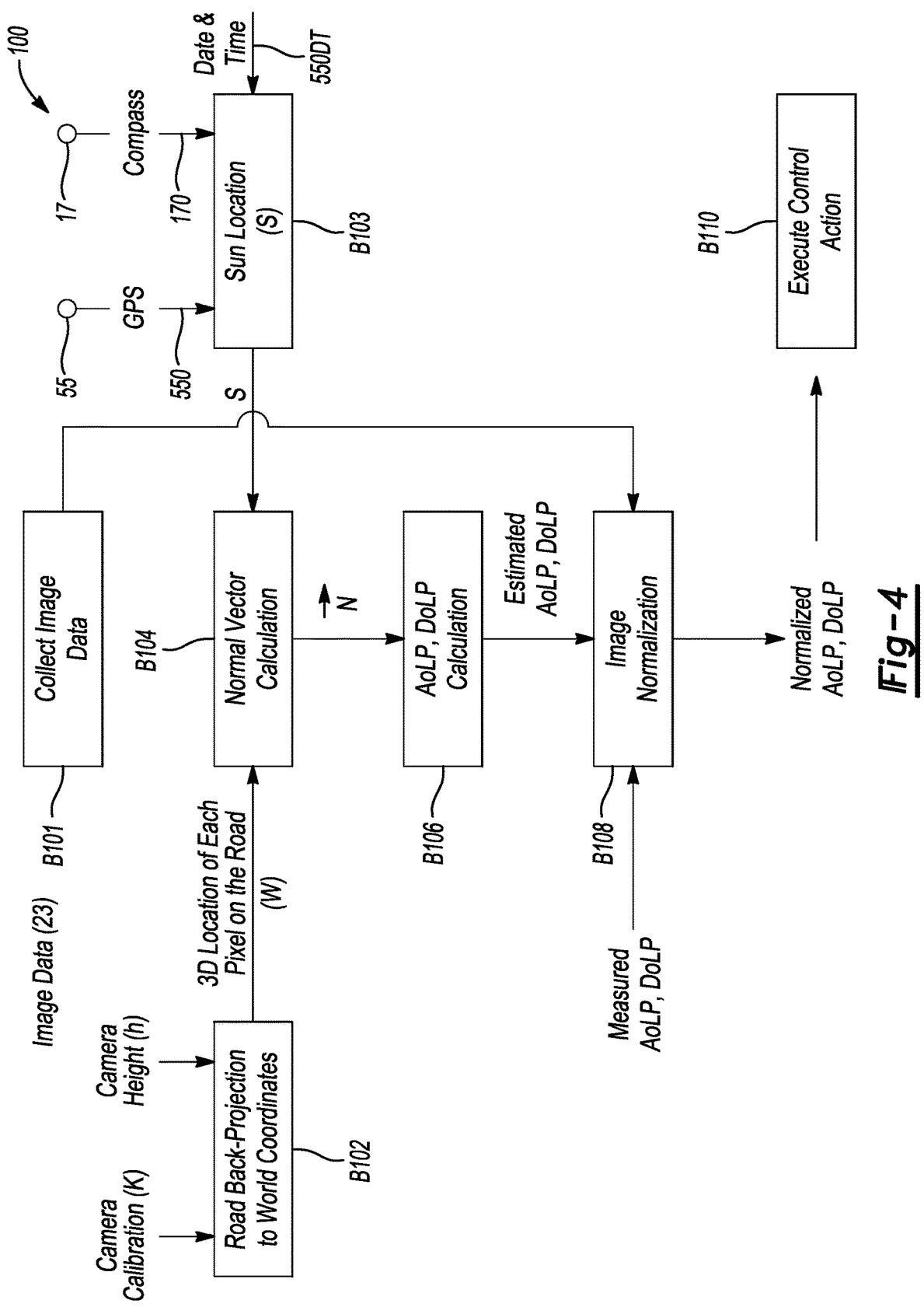
FIG. 4 is flow chart describing a method for normalizing polarimetric image data for performing perception tasks in accordance with the disclosure.

Referring to FIG. 4, the method 100 may be used with the host vehicle 10H of FIG. 1, e.g., the motor vehicle 10, when operating on the road surface 11. The method 100 is organized in FIG. 4 into discrete logic blocks. Each logic block in turn represents a particular step, function, or subprocess that is to be performed via the ECU 50 of FIGS. 1 and 2 when executing the present method 100.

In a possible implementation, the ECU 50 will initiate upon starting the motor vehicle 10 before proceeding to block B101. Block B101 ("Collect Image Data") includes collecting the polarimetric image data 23 of a drive scene using the polarimetric camera 20 of FIGS. 1, 2, and 3. As noted above, the imaged drive scene includes a potential driving path of the motor vehicle 10 on the drivable road surface 11. The method 100 proceeds to block B101 after commencing the collection of the polarimetric image data 23.

Block B101 ("Collect Image Data") includes imaging the drive scene via the camera 20 of FIG. 1. The camera 20 then outputs the polarimetric image data 23 of FIG. 2 to the ECU 50 for processing. The method 100 then proceeds to block B102.

Block B102 ("Road Back-Projection to World Coordinates") includes receiving camera calibration data (K) for the camera 20. As appreciated in the art, camera calibration involves the determination of relevant parameters or coefficients needed for ascertaining the relationship between a point in 3D space in the imaged drive scene and the corresponding 2D pixel projection in the collected image data. As such, the calibration data (K) used in block B102 includes extrinsic and intrinsic parameters.

With respect to camera calibration parameters in general, extrinsic parameters typically include at least camera rotation and translation, and represent a transformation of 3D coordinates in the "real world" of the imaged drive scene, i.e., the Cartesian x, y, z coordinates of a point in the drive environs, to a corresponding 3D coordinate space of the camera 20. Intrinsic parameters for their part include focal length, the optical center/principal point, and the skew coefficient, are used to project the 3D space of the camera 20 into 2D image coordinates.

In addition to extrinsic and intrinsic parameters, block B102 also includes receiving the camera height (h) above the road surface 11 as shown in FIG. 3, which is likewise prerecorded in memory 54 of the ECU 50 and accessible thereby. The ECU 50 then outputs a corresponding 3D point (W) of each image pixel on the drivable road surface 11 of FIGS. 1 and 3, with this action occurring as an electronic signal. The method 100 thereafter proceeds to block B103.

At block B103 ("Sun Location (S)"), the ECU 50 receives the GPS signals 130 via the GPS receiver 55, including a time-and-date stamped location 550DT of the motor vehicle 10, and also receives the current directional heading signals 170 of the motor vehicle 10 from the compass 17. Using this information, the ECU 50 estimates the present location of the Sun 15 relative to the motor vehicle 10 of FIG. 1, i.e., the Sun location (S). The Sun location (S) is thereafter communicated to block B104, to which the method 100 thereafter proceeds.

B104 ("Normal Vector Calculation"), the ECU 50 calculates the surface normal ($\vec{N}$) of FIG. 3 for each constituent image pixel of the road surface 11 of FIG. 1. This calculation is performed using the estimated Sun location (S) from block B103 and the corresponding 3D location (W) of each image pixel on the drivable road surface 11 from block B102. In other words, the surface normal ($\vec{N}$), at a macroscopic resolution, lies in the plane defined by three points: (1) the Sun location (S), the location (C) of the camera 20, and the point (W) corresponding to a pixel of interest in the imaged drive scene of FIG. 3. The surface normal ($\vec{N}$) is the vector bisecting the $\overline{SW}$ and $\overline{CW}$ rays in this arrangement. The method 100 then proceeds to block B106.

Block B106 ("AoLP, DoLP Calculation") includes receiving the estimated normal ($\vec{N}$) from block B104 as described above and shown in FIG. 3. Using the estimated normal ($\vec{N}$) information, the ECU 50 calculates an estimated value for the AoLP and DoLP. As understood in the art, AoLP and DoLP are calculatable from polarization physics. For instance, with AoLP ($\phi$) and DoLP ($\rho$), these values may be calculated by the ECU 50 from the azimuth ($\alpha$) and the zenith ($\theta$) angles of the local normal ($\vec{N}$) as follows:

$$\phi = \alpha - \frac{\pi}{2}$$

$$\rho = \frac{2\sin^2\theta\cos\theta\sqrt{n^2 - \sin^2\theta}}{n^2 - \sin^2\theta n^2 - n^2\sin^2\theta + 2\sin^4\theta}$$

where n is the refractive index of the road surface 11. The method 100 thereafter proceeds to block B108.

At block B108 ("Image Normalization"), the ECU 50 of FIGS. 1 and 2 receives a measured AoLP and a measure DoLP from the camera 20 as part of the polarimetric image data 23, i.e., an actual AoLP and DoLP in contrast to the estimated values from block B106. The ECU 50 normalizes the polarimetric image data 23 such that the ground plane 11P has a normalized representation. The normalized images are obtained as follows:

Normalized $AoLP(x, y)$ = |measured $AoLP(x, y)$ − estimated $AoLP(x, y)$|

Normalized $DoLP(x, y)$ = |measured $DoLP(x, y)$ − estimated $DoLP(x, y)$| where |x| is the absolute value of x. In this manner, the ground plane 11P is constructed in the imaged drive scene with the exemplary conical form:

Normalized AoLP (ground plane)=0°; and
Normalized DoLP (ground plane)=0°.

As part of block B108, for instance, the AoLP of the road surface 11 is ultimately set equal to a predetermined angular value, e.g., 0° as noted above, or another consistent/fixed angular value. The output of block B108 is therefore a normalized AoLP and DoLP, an effect of which is the stretching of the dynamic range of the resulting image. The method 100 thereafter proceeds to block B110.

Block B110 ("Execute Control Action") of FIG. 4 includes executing a control action aboard the motor vehicle 10 of FIG. 1 using the normalized AoLP and DoLP representation from block B108. As noted above, embodiments of the camera 20 could include an RGB-polarimetric camera or a monochrome-polarimetric camera. The ECU 50 therefore may be configured to use RGB image data or monochromatic image data in addition to the polarimetric data in the polarimetric image data 23 to perceive the ground plane 11P as part of a perception function performed by a path planning controller, e.g., the PPM 62 of FIG. 2. The control action in such an implementation could thus include outputting the normalized representation of the AoLP and DoLP to the PPM 62. Alternatively or in a combined embodiment, the motor vehicle 10 could include the display screens 600 of FIG. 2, in which case the control action of block B110 may entail displaying a graphical representation of the road surface 11 on the display screen(s) 600 via the PPM 62 and/or the ECU 50.

As will be appreciated by those skilled in the art in view of the foregoing disclosure, the ECU 50 and corresponding method 100 performed by the ECU 50 are directed toward improving the effectiveness of computer-based perception tasks. To this end, the ECU 50 uses polarization state information that is present in the collected polarimetric image data 23 and other inputs to normalize the polarimetric image data 23. The normalized images are then used in one or more control actions or functions aboard the host vehicle 10H of FIG. 1. The polarized state is a function of the materials in the imaged drive scene, as well as the amount and direction of light admitted into the drive scene and the particular location of the collected polarimetric image data 23.

With respect to the drive scene's lighting, the Sun location (S) relative to the location of the host vehicle 10H is constantly changing depending on the time of day and year, and the direction in which the motor vehicle 10 is positioned relative to North. Machine learning-based estimations performed, e.g., using neural networks, would ordinarily require a library of training images for every possible Sun location in a given drive scene. The present method 100 therefore greatly reduces the amount of required training data, as the variable nature of the Sun location (S) accounted for by application of the normalization logic 50N of FIG. 2. In the normalized representation of the polarimetric image data 23, therefore, the road surface 11 will appear as 0° (or another fixed angular value) in the resulting 2D images. This action is equivalent to setting the reference plane for AoLP equal to 0°. Regardless of the Sun location (S) when operating the camera 20, in other words, the present teachings will ensure that the Sun location (S) does not affect the polarimetric representation of the imaged drive scene. These and other attendant benefits of the present disclosure will be appreciated by those skilled in the art in view of the foregoing disclosure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A system for a host vehicle operating on a road surface illuminated by the Sun, comprising:
a polarimetric camera positioned at a height (h) above a ground plane of the road surface and configured to collect polarimetric image data of a drive scene inclusive of the road surface;
a global positioning system ("GPS") receiver operable for determining a present location of the host vehicle;
a compass operable for determining a directional heading of the host vehicle;
a path planning module; and
an electronic control unit ("ECU") configured to:
receive the polarimetric image data, the present location, date, and time, and the directional heading from the polarimetric camera, the GPS receiver, and the compass, respectively;
estimate a location of the Sun relative to the host vehicle using the present location, date, and time, and the directional heading;
construct a normalized representation of the polarimetric image data using the location of the Sun, via normalization logic of the ECU, in which an angle of linear polarization ("AoLP") and a degree of linear polarization ("DoLP") of the road surface equal predetermined fixed values of 0° and 0, respectively, such that the ground plane fits a standardized canonical representation; and
execute a control action aboard the host vehicle using the normalized representation of the polarimetric image data, including:
outputting the normalized representation of the road surface to the path planning module; and
during an autonomous or semi-autonomous drive event of the host vehicle, causing the path planning module to auto-generate a driving path on the road surface using the normalized representation of the road surface, the driving path utilizing identified free space that separates drivable surfaces of the road surface from non-drivable surfaces of the road surface.

2. The system of claim 1, wherein the ECU is configured to:
calculate a surface normal ($\vec{N}$) for each image pixel of the road surface using the location of the Sun and a corresponding 3D location (W) of each image pixel on the road surface;
estimate the AoLP and a degree of polarization ("DoLP") as estimated AoLP and DoLP values using the surface normal ($\vec{N}$); and
normalize the polarimetric image data using the estimated AoLP and DoLP values.

3. The system of claim 1, wherein the host vehicle is a motor vehicle having a vehicle body, and wherein the camera is connected to the vehicle body.

4. The system of claim 3, wherein the camera is a color-polarimetric camera, and wherein the ECU is configured to use color image data from the color-polarimetric camera to perceive the road surface.

5. The system of claim 1, further comprising:
a display screen located aboard the host vehicle, wherein the path planning control module is configured to display a graphical representation of the road surface via the display screen.

6. A method for use with a host vehicle operating on a road surface illuminated by the Sun, comprising:
collecting polarimetric image data of a drive scene using a polarimetric camera positioned at a height (h) above a ground plane of the road surface, wherein the drive scene includes the road surface;
receiving the polarimetric image data from the polarimetric camera via an electronic control unit (" ECU"), a present location, date, and time of the host vehicle via a global positioning system ("GPS") receiver, and a directional heading of the host vehicle via a compass;
estimating a location of the Sun using the present location, date, and time and the directional heading;
constructing a normalized representation of the polarimetric image data using the location of the Sun, via normalization logic of the ECU, such that an angle of linear polarization ("AoLP") and a degree of linear polarization ("DoLP") of the road surface equal predetermined fixed values of 0° and 0, respectively, such that the ground plane fits a standardized canonical representation; and
executing a control action aboard the host vehicle using the normalized representation of the polarimetric image data, including:
outputting the normalized representation of the road surface to a path planning module; and
during an autonomous or semi-autonomous drive event of the host vehicle, causing the path planning module to auto-generate a driving path on the road surface using the normalized representation of the road surface, the driving path utilizing identified free space that separates drivable surfaces of the road surface from non-drivable surfaces of the road surface.

7. The method of claim 6, further comprising:
calculating a surface normal ($\vec{N}$) for each image pixel of the road surface using the location of the Sun and a corresponding 3D location (W) of each image pixel on the road surface;
estimating the AoLP and a degree of polarization ("DoLP") as estimated AoLP and DoLP values using the surface normal ($\vec{N}$) and the corresponding 3D location (W); and
normalizing the polarimetric image data using the estimated AoLP and DoLP values.

8. The method of claim 6, wherein the host vehicle is a motor vehicle having a vehicle body to which the camera is connected as a body-mounted camera, and wherein receiving the polarimetric image data includes receiving the polarimetric data from the body-mounted camera.

9. The method of claim 8, wherein the body-mounted camera includes a color-polarimetric camera, and wherein the ECU is configured to use color image data from the color-polarimetric camera to perceive the road surface as part of a perception function.

10. The method of claim 6, wherein the host vehicle includes a display screen, further comprising:
displaying a graphical representation of the road surface on the display screen via the path planning control module and/or the ECU.

11. A motor vehicle, comprising:
a vehicle body;
road wheels connected to the vehicle body;
a path planning module; and
a system including:
a polarimetric camera mounted to the vehicle body at a height (h) above a ground plane of a road surface and configured to collect polarimetric image data of a drive scene that is illuminated by the Sun, the drive scene including the road surface;

a global positioning system ("GPS") receiver operable for determining a present location, date, and time of the motor vehicle;

a compass operable for determining a directional heading of the motor vehicle; and an electronic control unit ("ECU") configured to:
  receive polarimetric image data from the polarimetric camera;
  estimate a location of the Sun relative to the camera using the present location, date, and time of the motor vehicle and the directional heading of the motor vehicle;
  normalize the polarimetric image data using the location of the Sun, such that the road surface has a normalized representation in which an angle of linear polarization ("AoLP") and a degree of linear polarization ("DoLP") of the road surface equal predetermined fixed values of 0° and 0, respectively, such that the ground plane fits a standardized canonical representation; and
  execute a control action aboard the motor vehicle using the normalized representation including:
    outputting the normalized representation of the road surface to the path planning module; and
    during an autonomous or semi-autonomous drive event of the motor vehicle, causing the path planning module to auto-generate a driving path on the road surface using the normalized representation of the road surface, the driving path utilizing identified free space that separates drivable surfaces of the road surface from non-drivable surfaces of the road surface.

12. The motor vehicle of claim 11, wherein the ECU is configured to calculate a surface normal ($\vec{N}$) for each image pixel of the road surface using the location of the Sun and a location of the camera relative to the road surface, estimate the AoLP and a degree of polarization (" DoLP ") as estimated AoLP and DoLP values using the surface normal ($\vec{N}$), and normalize the polarimetric image data using the estimated AoLP and DoLP values.

13. The motor vehicle of claim 11, wherein the camera is a color-polarimetric camera, and wherein the ECU is configured to use color image data from the color-polarimetric camera to perceive the road surface as part of a perception function.

14. The motor vehicle of claim 11, further comprising:
  a display screen, wherein the path planning control module or the ECU is configured to display a graphical representation of the road surface via the display screen.

15. The system of claim 3, wherein the camera is a monochrome-polarimetric camera, and wherein the ECU is configured to use monochromatic image data from the monochrome-polarimetric camera to perceive the road surface.

16. The method of claim 8, wherein the body-mounted camera includes a monochrome-polarimetric camera, and wherein the ECU is configured to use monochromatic image data from the monochrome polarimetric camera to perceive the road surface as part of a perception function.

17. The motor vehicle of claim 11, wherein the camera is a monochrome-polarimetric camera, and wherein the ECU is configured to use monochromatic image data from the monochrome-polarimetric camera to perceive the road surface as part of a perception function.

18. The system of claim 1, wherein the host vehicle includes a windshield and a heads-up display (HUD), and wherein the ECU is configured to controlling the HUD such that the HUD projects a graphical representation of the estimated free space onto the windshield.

19. The method of claim 6, wherein the host vehicle includes a windshield and a heads-up display (HUD), the method comprising:
  projecting a graphical representation of the estimated free space onto the windshield via the HUD.

20. The method of claim 19, wherein projecting the graphical representation of the estimated free space onto the windshield via the HUD includes projecting a color view of the drive scene ahead of the host vehicle.

* * * * *